United States Patent
Miller et al.

(10) Patent No.: US 12,078,997 B2
(45) Date of Patent: Sep. 3, 2024

(54) OPTIMUM SCREED ANGLE OF ATTACK SETTING AND AUTOMATIC ADJUSTMENT

(71) Applicant: Caterpillar Paving Products Inc., Brooklyn Park, MN (US)

(72) Inventors: Dana W Miller, Rogers, MN (US); Toby A. Frelich, Saint Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 360 days.

(21) Appl. No.: 17/469,631

(22) Filed: Sep. 8, 2021

(65) Prior Publication Data
US 2023/0074055 A1     Mar. 9, 2023

(51) Int. Cl.
| | | |
|---|---|---|
| *G05D 1/02* | (2020.01) | |
| *E01C 19/48* | (2006.01) | |
| *E01C 23/01* | (2006.01) | |
| *G05D 1/00* | (2024.01) | |

(52) U.S. Cl.
CPC ....... *G05D 1/0219* (2013.01); *E01C 19/4873* (2013.01); *E01C 23/01* (2013.01); *G05D 1/0088* (2013.01)

(58) Field of Classification Search
CPC ...... E01C 19/48; E01C 19/4873; E01C 23/01; E01C 2301/16; G05D 1/0088; G05D 1/0219; G05D 2201/0202
See application file for complete search history.

(56) References Cited

U.S. PATENT DOCUMENTS

| | | | | |
|---|---|---|---|---|
| 5,568,992 | A * | 10/1996 | Grembowicz | E01C 19/48 404/101 |
| 6,158,921 | A * | 12/2000 | Holmes | E01C 19/42 404/104 |
| 8,128,314 | B2 * | 3/2012 | Buschmann | E01C 19/48 404/104 |
| 8,944,719 | B2 * | 2/2015 | Frelich | E01C 19/48 701/50 |
| 9,045,871 | B2 * | 6/2015 | Graham | E01C 19/4873 |
| 9,382,675 | B2 * | 7/2016 | Frelich | E01C 19/4853 |
| 9,441,334 | B1 * | 9/2016 | Frelich | E01C 19/48 |
| 10,227,738 | B2 | 3/2019 | Horn et al. | |
| 10,550,529 | B2 * | 2/2020 | Jorgensen | E01C 19/48 |
| 11,242,658 | B2 * | 2/2022 | Kappel | E01C 19/4873 |

(Continued)

FOREIGN PATENT DOCUMENTS

| | | |
|---|---|---|
| CN | 103161117 | 6/2013 |
| CN | 104141274 | 8/2016 |

(Continued)

*Primary Examiner* — Tyler J Lee

(57) ABSTRACT

A paving machine can include a frame; a screed coupled to the frame; and the screed including a main screed plate and an extender screed plate, each of the main screed plate and the extender screed plate having an angle sensor associated therewith, the angle sensor for each of the main screed plate and the extender screed plate being positioned and configured to determine a paving angle of the main screed plate and the extender screed plate; and a controller, the controller configured to receive the paving angles of the main screed plate and the extender screed plate from the angle sensors and to change the paving angle of the main screed plate and the paving angle of the extender screed plate independently of each other.

18 Claims, 3 Drawing Sheets

(56) References Cited

U.S. PATENT DOCUMENTS

| | | | |
|---|---|---|---|
| 2010/0150650 A1* | 6/2010 | Buschmann | E01C 19/48 404/82 |
| 2010/0150651 A1* | 6/2010 | Buschmann | E01C 19/48 404/82 |
| 2014/0186115 A1* | 7/2014 | Graham | E01C 19/4873 404/75 |
| 2016/0115654 A1* | 4/2016 | Pedersen | E01C 19/48 404/108 |
| 2021/0062440 A1 | 3/2021 | Kappel et al. | |

FOREIGN PATENT DOCUMENTS

| | | |
|---|---|---|
| CN | 206070315 | 4/2017 |
| EP | 3276080 | 12/2019 |

* cited by examiner

OPTIMUM SCREED ANGLE OF ATTACK SETTING AND AUTOMATIC ADJUSTMENT

TECHNICAL FIELD

The present disclosure generally relates to paving equipment. More particularly, the present disclosure relates to an asphalt paving machine.

BACKGROUND

Paving machines are used to apply, spread, and compact paving material relatively evenly over a desired surface. These machines are regularly used in the construction of roads, parking lots and other areas where a smooth durable surface is required for cars, trucks, and other vehicles to travel. An asphalt paving machine generally includes a hopper for receiving asphalt material from a truck and a conveyor system for transferring the asphalt rearwardly from the hopper for discharge onto a roadbed. Screw augers may be used to spread the asphalt transversely across the roadbed in front of a screed. A screed plate on the screed smooths and somewhat compacts the asphalt material and ideally leaves a roadbed of uniform depth and smoothness.

Sometimes there are paving problems due to poor paving practices used by operators that cause wear and tear on machines. Currently, poor paving practices are common when it comes to paving with asphalt and a floating screed. The operators commonly set the screed up incorrectly and adjust the screed incorrectly which leads to less than perfect results or accelerated wear on the machine.

CN 103161117 discuss a sensor-based automatic leveling system for a paver.

SUMMARY

In an example according to this disclosure, a paving machine can include a frame; a screed coupled to the frame; and the screed including a main screed plate and an extender screed plate, each of the main screed plate and the extender screed plate having an angle sensor associated therewith, the angle sensor for each of the main screed plate and the extender screed plate being positioned and configured to determine a paving angle of the main screed plate and the extender screed plate; and a controller, the controller configured to receive the paving angles of the main screed plate and the extender screed plate from the angle sensors and to change the paving angle of the main screed plate and the paving angle of the extender screed plate independently of each other.

In one example, a paving machine can include a frame; a screed coupled to the frame; the screed including a main screed plate and an extender screed plate; each of the main screed plate and the extender screed plate having an angle sensor associated therewith; the angle sensor for each of the main screed plate and the extender screed plate being positioned and configured to determine a paving angle of the main screed plate and the extender screed plate, wherein each of the main screed plate and the extender screed plate are controlled by one or more actuators positioned to raise and lower portions of the main screed plate and the extender screed plate independently of each other such that the main screed plate and the extender screed plate can have different paving angles; and a controller, the controller configured to receive the paving angles of the main screed plate and the extender screed plate from the angle sensors and to change the paving angle of the main screed plate and the paving angle of the extender screed plate independently of each other using the one or more actuators, based historical paving information stored in the controller.

In one example, a method of setting and adjusting an angle of attack for a screed can include measuring a paving angle of each of a main screed plate and an extender screed plate; and changing the paving angle of the main screed plate and the extender screed plate independently of each other to reach a proper paving angle for each of the main screed plate and the extender screed plate.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
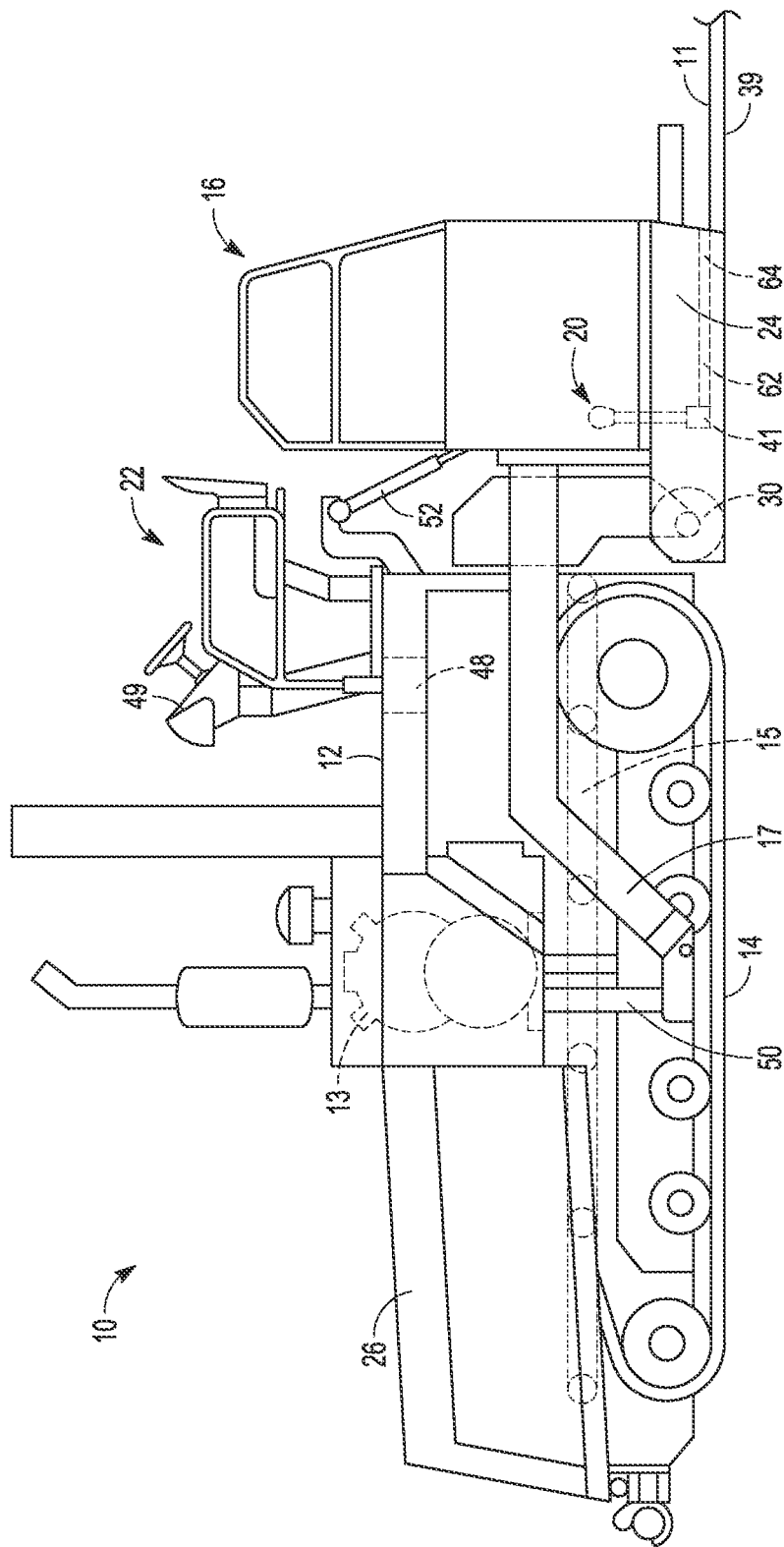
FIG. 1 shows a side view of a paving machine, in accordance with one embodiment.

FIG. 1 shows a side view of a paving machine 10 in accordance with one embodiment. The paving machine 10 generally includes a frame 12 with a set of ground-engaging elements 14 such as tracks or wheels coupled with the frame 12. The ground-engaging elements 14 may be driven by an engine 13 in a conventional manner. A screed 16 can be positioned at the rear end of the paving machine 10 to spread and compact paving material into an asphalt mat 11 having a desired thickness, size, uniformity, crown profile and cross slope. The paving machine 10 also includes an operator station 22 having a seat and a console, which includes various controls for directing operations of the paving machine 10 by inputting instructions at an input panel 49. A controller 48 is provided for electrically controlling various aspects of the paving machine 10, For example, the controller 48 can send and receive signals from various components of the paving machine during the operation of the paving machine 10.

The paving machine 10 further includes a hopper 26 for storing a paving material, and a conveyor system including one or more conveyors 15 configured to move paving material from the hopper 26 to the screed 16 at the rear of the paving machine 10. One or more augers 30 are arranged near the forward end of the screed 16 to receive the paving material supplied by the conveyor 15 and spread the material evenly beneath the screed 16.

Reference to the "forward" end of the screed 16 means the end of screed 16 facing in the direction of travel of paving machine 10 as paving machine 10 is applying the paving material to a surface (to the left in FIG. 1), Similarly, reference to a "forward-facing" surface of a component of screed 16 means a surface facing in the direction of travel of paving machine 10 while paving machine 10 is applying paving material to a surface, while reference to an "aft-facing" surface of a component means a surface facing away from the direction of travel of paving machine 10 while paving machine 10 is applying paving material to a surface (to the right in FIG. 1).

The screed 16 can be pivotally coupled behind the paving machine 10 by a pair of tow arms 17 that extend between the frame 12 of the paving machine and the screed 16. The tow arms 17 can be pivotally connected to the frame 12 such that the relative position and orientation of the screed 16 relative to the screed frame and to the surface being paved may be adjusted by pivoting the tow arms 17, for example, in order to control the thickness and grade of the paving material deposited by the paving machine 10.

The screed 16 can include a screed frame 24 with a main screed plate 62 coupled to the screed frame 24. The main screed plate 62 is configured to float on the paving material of the asphalt mat 11 laid upon a prepared paving bed and to "smooth" or level and compact the paving material on the base surface, such as for example a roadway or roadbed. The screed 16 can further include one or more extender screed plates 64 that extend beyond the width of the main screed plate 62 to extend the paving width of the screed 16.

The position of the screed 16 relative to the tow arms 17 can be controlled or adjustable by a cylinder 50. This cylinder 50 can be raised or lowered to change the paving angle or angle of attack of the screed 16.

Also, there can be one or more cylinders 52 on the screed 16 to allow for the screed plate 62 to be pivoted to change the angle of attack of the screed 16. Still other approaches to controlling and/or adjusting the pivoted position of the screed 16 can be provided.

The main screed plate 62 and extender screed plate 64 can be arranged on a bottom side of the frame 24. The main screed plate 62 and extender screed plate 64 may be adapted to smooth out and initially press on the loose asphalt material to establish a roadway surface. The pivoting position of the screed frame 24 can determine the paving angle of the screed plates 62, 64 which may define an angle of attack relative to a ground surface 39 on which the mat of asphalt is being applied.

The screed 16 can include a tamper bar assembly 20 positioned forward of the screed plate 62 and extending transversely to the direction of travel of the paving machine 10. The tamper bar assembly 20 may include a tamper bar 41. Tamper bar assembly 20 can be coupled to the screed frame 24 of screed 16 and configured such that the tamper bar 41 is reciprocated in an upward and downward direction substantially perpendicular to the asphalt mat 11 and substantially perpendicular to the direction of travel of paving machine 10.

As noted above, poor paving practices done by operators can cause wear and tear on machines. The operators commonly set the screed up incorrectly and adjust the screed incorrectly which yields less than perfect results or accelerated wear on the machine. Accordingly, the present system provides a system to change the paving angles of the screed to the proper or optimum paving angle.

Figure 2:
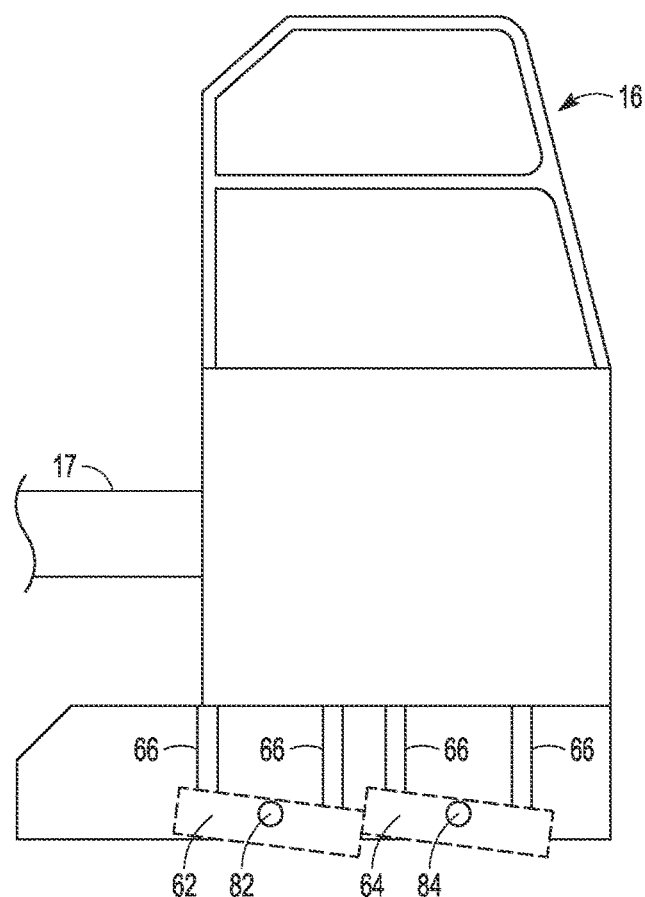
FIG. 2 shows a schematic view of portions of a screed, in accordance with one embodiment.
Figure 3:
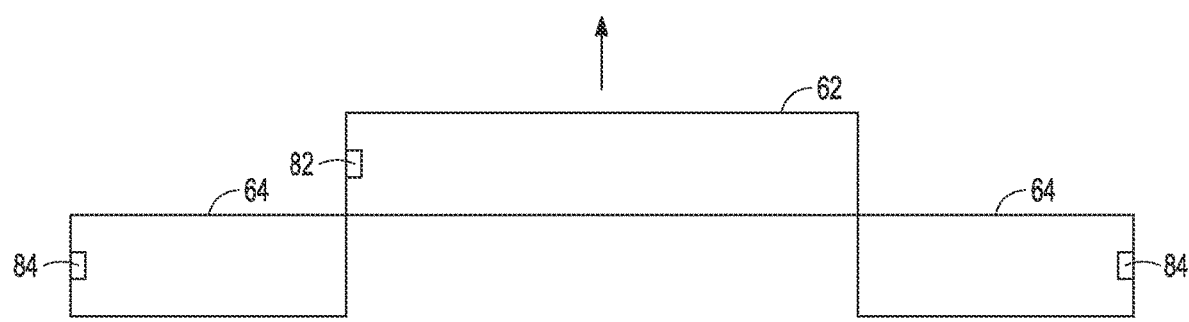
FIG. 3 shows a bottom view of a main screed plate and extender plates, in accordance with one embodiment.

FIG. 2 shows a schematic view of portions of the screed 16, in accordance with one embodiment. FIG. 3 shows a bottom view of the main screed plate 62 and extender screed plates 64, in accordance with one embodiment.

In this example, the main screed plate 62 is shown to be in front of the extender screed plates 64. In other embodiments, the extender screed plates 64 can be forward of the main screed plate in a front mount configuration.

In this example, each of the main screed plate 62 and the extender screed plate 64 can include an angle sensor 82, 84 associated therewith. The angle sensor 82, 84 for each of the main screed plate 62 and the extender screed plate 64 can be positioned and configured to determine the paving angles of the main screed plate 62 and the extender screed plate 64. In various examples, the angle sensors 82, 84 can be connected directly to the screed plates 62, 64 themselves or the angle sensors 82, 84 can be located on adjacent screed structure that maintains a parallel plane with the screed plates 62, 64. In some examples, the angles sensors 82, 84 can include position sensors in one or more actuators 66 associated with each of the screed plates 62, 64. As will be discussed below, the one or more actuators 66 can include hydraulics cylinders or electrical actuators, and the sensors 82, 84 can be incorporated into the actuators 66 such that he controller 48 can determine the angles of the screed plates 62, 64 based on the position of the hydraulic cylinder or electrical actuator.

The angle sensors 82, 84 can be connected to the machine controller 48. (FIG. 1). Thus, the controller 48 can know the angle of any of the screed plates 62, 64 at any given time. The controller 48 is configured to receive the paving angles of the main screed plate 62 and the extender screed plate 64 from the angle sensors 82, 84 and to determine if the paving angles are at the proper or optimum position. The controller can include a database of proper paving angles for the screed plates 62, 64 based on past history in view of paving depth, paving width, material flow, and other factors. Thus, the proper paving angles are determined by the best practices in the paving industry.

In one embodiment, the controller 48 can change the paving angles automatically or alert the operator to change the paving angles. The paving angles of each of the main screed plate 62 and the extender screed plate 64 can be changed independently of each other. Thus, if the extender screed plates 64 need an adjustment according to the controller 48, the extender screed plates 64 can have the paving angle changed without changing the paving angle of the main screed plate 62. Of course, the paving angles of all the screed plates 62, 64 can be adjusted simultaneously and similarly to each other, if so desired.

In this example, the paving angle position of each of the main screed plate 62 and the extender screed plate 64 can be controlled by the one or more actuators 66. Accordingly, each of the main screed plate 62 and the extender screed plate 64 can be controlled by the one or more actuators 66 which are positioned to raise and lower portions of the main screed plate 62 and the extender screed plate 64 independently of each other such that the main screed plate 62 and the extender screed plate 64 can have different paving angles.

In various examples, the actuators 66 can include hydraulic cylinders to raise and lower portions of the main screed plate 62 and the extender screed plate 64. Or the actuators 66 can include electrical linear actuators or other mechanisms to raise and lower portions of the main screed plate 62 and the extender screed plate 64. The actuators 66 can be connected to the controller 48 to allow the controller to automatically change the paving angles of the screed plates 62, 64. In one example, the actuators 66 can include a manually actuated mechanism controlled by using an integrated actuator system or a mechanical tool used by the operator.

Accordingly, the present system uses the angle sensors 82, 84 to minimize poor paving practices. The use of the angle sensors 82, 84 on the main screed plate 62 and the extender screed plate 64 can permit the system to know the attitude and paving angle of each of the screed plates 62, 64. These sensors 82, 84 can be used during setup and during a paving operation. During paving, the sensors 82, 84 can tell if the extender screed plate 64 and the main screed plate 62 are running too steep or too shallow than optimal for the application. The adjustments to the screed plates can be done automatically by software in the controller 48 or manually by the operator to allow the screed 16 to operate in the optimal range. Relying on historical information about the optimal settings and performance for the screed plates 62, 64 result in controlling the software and/or digital readout for proper settings.

In the setup arena, if the screed plates 62, 64 are set in an angle that is not optimal, this information can be sent to the controller and the controller 48 can keep the paving machine 10 from moving until the screed plates 62, 64 are put into optimal position, based on the historical paving information.

INDUSTRIAL APPLICABILITY

The present system is applicable to paving systems. The present system allows for the screed of a paving machine to always be at the proper angle of attack. Specifically, the system allows the main screed plate and extender screed plates of the screed to all be independently controlled so the screed plates are at a paving angle that is proper for the specific paving situation based on historical paving data and paving practice in view one or more factors including paving depth, paving width, material feed, machine speed, and other factors.

Figure 4:
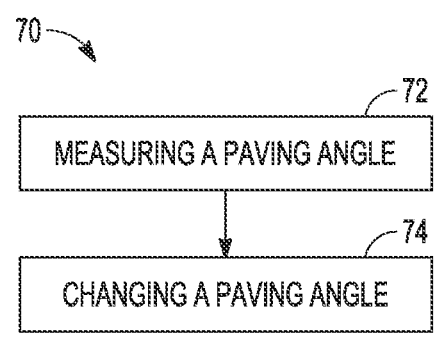
FIG. 4 shows a method of setting and adjusting an angle of attack for a screed, in accordance with one embodiment.

Referring to FIG. 4, in one example, a method (70) of setting and adjusting an angle of attack for a screed can include: measuring a paving angle (72) of each of a main screed plate and an extender screed plate; and changing the paving angle (74) of the main screed plate and the extender screed plate independently of each other to reach a proper paving angle for each of the main screed plate and the extender screed plate.

As discussed above, the proper paving angle can be determined by a controller based in part on paving depth and paving width and historical paving information stored in the controller.

The paving angle change can be done automatically by the controller, or the controller can inform the operator to manually change the paving angles of the main screed plate and the extender screed plate.

Accordingly, the use of angle sensors on then screeds helps to minimize poor paving practices. The use of angle sensors on the main screed plate and the extender screed plates will allow the system to know the paving angles. The angle sensors can be used during paving and during setup. In the setup arena, if the screed is set in an angle that is not optimal, this could be used to keep the paver from starting until the screed is put into optimal position.

The above detailed description is intended to be illustrative, and not restrictive. The scope of the disclosure should, therefore, be determined with references to the appended claims, along with the full scope of equivalents to which such claims are entitled.

What is claimed is:

1. A paving machine comprising:
   a frame;
   a screed coupled to the frame;
   the screed including a main screed plate and an extender screed plate, each of the main screed plate and the extender screed plate having an angle sensor associated therewith, the angle sensor for each of the main screed plate and the extender screed plate being positioned and configured to directly determine a paving angle of attack of the main screed plate and the extender screed plate from only the angle sensors, wherein the paving angle of attack is the angle from a side view of the screed; and
   a controller, the controller configured to receive the paving angles of attack of the main screed plate and the extender screed plate from the angle sensors and to change the paving angle of attack of the main screed plate and the paving angle of attack of the extender screed plate independently of each other.

2. The paving machine of claim 1, wherein the controller is configured to prevent the paving machine from moving if the main screed plate and the extender screed plate are not positioned at a proper paving angle of attack.

3. The paving machine of claim 1, wherein changes to the paving angles of attack of the main screed plate and the extender screed plate are done automatically by the controller.

4. The paving machine of claim 1, wherein the controller informs an operator to manually change the paving angles of attack of the main screed plate and the extender screed plate.

5. The paving machine of claim 1, wherein the controller determines a proper paving angle of attack for the main screed plate and the extender screed plate from a database of historical paving information which includes data of a plurality of proper paving angles of attack.

6. The paving machine of claim 1, wherein the paving angle of attack of each of the main screed plate and the extender screed plate are controlled by actuators.

7. The paving machine of claim 6, wherein the actuators include hydraulic cylinders to raise and lower portions of the main screed plate and the extender screed plate.

8. The paving machine of claim 6, wherein the actuators include electrical linear actuators to raise and lower portions of the main screed plate and the extender screed plate.

9. A paving machine comprising:
   a frame;
   a screed coupled to the frame;
   the screed including a main screed plate and an extender screed plate, each of the main screed plate and the extender screed plate having an angle sensor associated therewith, the angle sensor for each of the main screed plate and the extender screed plate being positioned and configured to directly determine a paving angle of attack of the main screed plate and the extender screed plate from only the angle sensors, wherein the paving angle of attack is the angle from a side view of the screed, wherein each of the main screed plate and the extender screed plate are controlled by one or more actuators positioned to raise and lower portions of the main screed plate and the extender screed plate independently of each other such that the main screed plate and the extender screed plate can have different paving angles of attack; and
   a controller, the controller configured to receive the paving angles of attack of the main screed plate and the extender screed plate from the angle sensors and to change the paving angle of attack of the main screed plate and the paving angle of attack of the extender screed plate independently of each other using the one or more actuators, based on historical paving information stored in the controller, wherein the historical paving information includes data of a plurality of proper paving angles of attack.

10. The paving machine of claim 9, wherein the controller is configured to prevent the paving machine from moving if the main screed plate and the extender screed plate are not positioned at a proper paving angle of attack, respectively.

11. The paving machine of claim 9, wherein changes to the paving angles of attack of the main screed plate and the extender screed plate are done automatically by the controller.

12. The paving machine of claim 9, wherein the controller informs an operator to manually change the paving angles of attack of the main screed plate and the extender screed plate.

13. The paving machine of claim 9, wherein actuators include hydraulic cylinders to raise and lower portions of the main screed plate and the extender screed plate.

14. The paving machine of claim 9, wherein the actuators include electrical linear actuators to raise and lower portions of the main screed plate and the extender screed plate.

15. A method of setting and adjusting an angle of attack for a screed, the method comprising:
   directly measuring a paving angle of attack of each of a main screed plate and an extender screed plate from only angle sensors associated with each of the main screed plate and the extender screed plate, wherein the paving angle of attack is the angle from a side view of the screed; and
   changing the paving angle of attack of the main screed plate and the paving angle of attack of the extender screed plate independently of each other to reach a proper paving angle of attack for each of the main screed plate and the extender screed plate.

16. The method of claim 15, wherein the proper paving angles of attack for each of the main screed plate and the extender screed plate are determined by a controller based in part on paving depth and paving width and historical paving information stored in the controller.

17. The method of claim 15, wherein changing the paving angle of attack for each of the main screed plate and the extender screed plate is done automatically by a controller.

18. The method of claim 15, wherein a controller informs an operator to manually change the paving angles of attack of one or more of the main screed plate and the extender screed plate.

* * * * *